United States Patent Office 2,774,238
Patented Dec. 18, 1956

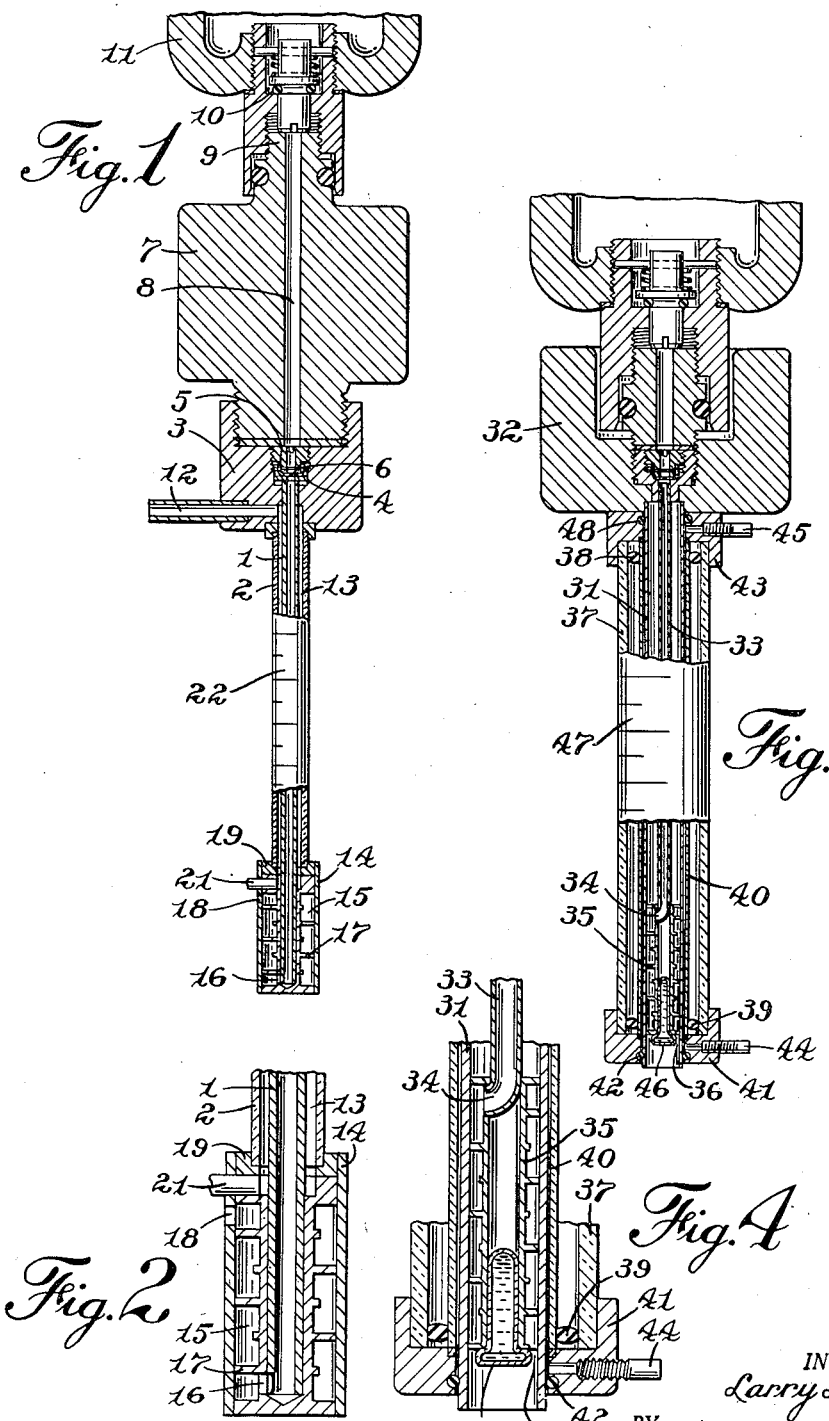

2,774,238

FREEZE-TESTER

Larry L. Gerwig, Elmira Heights, N. Y., assignor to Bendix Aviation Corporation, Elmira Heights, N. Y., a corporation of Delaware Application June 4, 1952, Serial No. 291,732

8 Claims. (Cl. 73—17)

The present invention relates to a freeze-tester for antifreeze liquids, and more particularly to an instrument for indicating quickly and unmistakably the actual freezing point of a liquid.

It is an object of the present invention to provide a novel freeze-tester which furnishes a persistent visual indication of the freezing temperature in relation to known standards without reliance on delicate and expensive thermometric devices.

It is another object to provide such a device which is simple and economical in construction while being completely reliable in operation.

Further objects and advantages will be apparent from the following description taken in connection with the accompanying drawing in which:

Fig. 1 is a vertical substantially mid-sectional view of a preferred embodiment of the invention;

Fig. 2 is an enlarged detail of the heat-exchanger portion of the same;

Fig. 3 is a view similar to Fig. 1 of a second embodiment of the invention; and

Fig. 4 is an enlarged detail of the heat-exchanger portion thereof.

In Fig. 1 of the drawing there is shown a freezing tube or rod 1 of heat-conductive material such as a suitable metal, preferably having a brightly polished exterior surface. A transparent insulating sheath 2 of glass or other insulating material is arranged to surround the freezing tube 1 in spaced relation thereto, and the upper ends of the tube and sheath are suitably mounted in a metallic coupling member 3. The tube 1 traverses the coupling member 3, in close thermal connection therewith and enters a socket 4 therein which is threaded to receive a cup member 5 having a small orifice 6 in its bottom. The coupling member 3 is also provided with a nipple 12 which connects with the annular space 13 between the freezing tube 1 and the sheath 2.

A large thermal mass 7 preferably in the form of a body of metal having high thermal conductivity is threaded into the coupling member 3 and is provided with a tubular central channel 8 which connects with a threaded nipple 9 adapted for the reception of a flask 11 of liquefied carbon dioxide or similar material under pressure which constitutes the source of cooling medium for freezing a sample of the liquid to be tested.

The flask 11 is provided with a manually operable valve 10 to control the admission of the liquefied carbon dioxide or the like to the cup 5. After passing through the orifice 6, the carbon dioxide expands and forms a mixture of cold gas and snow which constitutes the cooling medium, in the well-known manner.

A heat-exchanger fitting 14, mounted on the lower end of the freezing tube 1 is provided with an annular chamber 15 surrounding the end of the tube. An opening 16 is provided in the inner wall of the heat-exchanger 14 for admitting the cooling medium from the freezing tube into the chamber 15, and baffles or fins 17 in the chamber assist in the extraction of heat from the lower end of the tube as the cooling medium traverses the chamber before emerging at the exit 18.

The heat-exchanger 14 is also provided with a fitting 19 receiving the lower end of the sheath 2, and a nipple 21 which is in communication with the annular space 13 between the freezing tube and sheath.

Either the surface of the freezing tube 1 or of the sheath 2 is provided with a scale 22 throughout the length of the tube 1, which is preferably calibrated in convenient fractions of the temperature differential between the ends of the tube when the instrument is in use. In other words, if the temperature differential should be 160°, and the tube is ten inches long, a scale having divisions of one-sixteenth of an inch reads directly in degrees above the temperature of the lower end of the tube.

In the operation of this instrument, a sample of the liquid to be tested is circulated through the annular space 13 by means of the inlet and outlet nipples 12, 21 so as to wet the surface of the freezing tube 1, the space 13 being then drained to remove excess liquid. The cooling medium is then admitted from the flask 11 through the freezing tube 1 and heat-exchanger 14, whereby the lower end of the tube is cooled to a known temperature which is dependent upon the character of the cooling medium. When liquefied carbon dioxide is used, this temperature is close to −110° F. After this temperature has been attained, the flow of cooling medium is stopped. By this means, a known temperature gradient is established between the ends of the freezing tube 1 by virtue of the fact that the upper end of the tube is maintained substantially at ambient temperature by its close thermal connection to the heat mass 7.

It will be appreciated that the ambient temperature will vary to some extent depending on where the instrument is kept when not in use. It is expected that the most prevalent use of the device will be in gas and service stations which are customarily maintained in winter at a temperature in the neighborhood of 70° F. It may be assumed therefore that the range of temperature from end to end of the tube when in use will be about 180°, and the instrument will ordinarily be supplied with a scale in which one degree is $1/180$ of the exposed length of the tube 1.

If the instrument should be kept in a location in which the ambient temperature varies considerably from that assumed, the error in reading is quite small, particularly for the lower ranges of temperature. Thus, if an instrument calibrated as above is stored at a temperature of 80 degrees or a temperature of 60 degrees, the error in indicating a freezing point of minus 20 degrees would be only 5 degrees; while the error at minus forty degrees would be only 2 degrees.

The frost line of the material to be tested which has adhered to the surface of the freezing tube 1 is then observed and its position noted on the scale 22. Snce this scale is calibrated as above set forth on the basis of the known temperature differential between the ends of the freezing tube, it is thus possible to read off directly the freezing point of the sample.

In the embodiment of the invention illustrated in Figs. 3 and 4, a frost tube 31 is mounted at its upper end directly in the thermal mass and hand-grip member 32, and a cooling medium supply tube 33 traverses the frost tube 31 and discharges at 34 into a heat-exchanger member 35 at the lower end of the frost tube 31, the gas being permitted to emerge at 36.

A transparent insulating sheath 37, here shown in the form of a double walled glass tube sealed at its ends as indicated at 38 and 39, respectively, has a cup member 41 fixedly mounted on its lower end. This cup fits slidably over the bottom of the frost tube 31 and maintains the inner surface 40 of sheath 37 slightly spaced from the frost tube, the bearing of the cup on the tube being suitably sealed as by means of a packing ring 42. The upper end of the sheath 37 is similarly spaced from the tube 31 in coaxial relation by means of a cup member 43 fixed on the sheath and having a bearing on the frost tube 31 which is sealed by a packing ring 48.

Cup members 41 and 43 are provided with nipples 44 and 45 communicating with the interior of the sheath 37 for the introduction therein of a sample of the liquid to be tested. The annular space between the outer surface of the frost tube 31 and the inner surface 40 of the sheath 37 is preferably so small as to be of a capillary nature whereby relative rotation of said surfaces causes effective agitation of the film of liquid between them.

It has been found in practice that an optimum condition is obtained when the annular space between the freezing tube and sheath is less than five thousandths of an inch. When the film of liquid in this space is thus confined, it is subject mainly to capillary and fluid frictional forces, tending to spread the film uniformly over the surfaces of the tube and sheath and define the frost line more sharply.

A transparent flask 46 containing a small quantity of a standard liquid having a known freezing point which is substantially below the freezing point of any liquids to be tested, is inserted in the lower end of the frost tube 31 and heat-exchanger 35.

Either the frost tube itself, or its transparent sheath, is provided with a scale 47 which is calibrated as above described in terms of the temperature differential between conventional ambient temperature and the freezing point of the liquid in the flask 46.

When using this instrument to determine the freezing point of an unknown liquid, the space around the frost tube 31 is filled with a sample of the liquid to be tested in any suitable manner as by aspiration through the nipples 44 and 45 similarly to filling a pipette. Cooling medium is then admitted through the tube 33 to the heat-exchanger 35 till the sample of liquid in the flask 46 is seen to be frozen, as observed through the bottom of the flask. The cooling medium is then shut off, and the instrument permitted to warm up until the liquid in flask 46 melts, thus establishing the instant temperature of the cold end of the frost tube at the freezing point of the standard liquid. The scale reading of the frost line on the frost tube 31 is then taken, and the freezing point of the unknown liquid is thereby determined.

The movable mounting of the sheath 37 on the frost tube 31 by means of the sealed bearing cups 41 and 43 enables the sheath and the frost tube to be manually rotated relative to each other. The agitation caused by such relative rotation has been found to assist in the crystallization of the film of liquid on the frost tube and thereby form a more sharply defined and accurate frost line than may be secured without such agitation. The heat imparted to the heat mass 32 by the hand of the operator while producing such relative rotation of the parts tends to balance the slight drain of heat from said heat mass through the frost tube 31 in establishing the temperature gradient between the ends of said tube, thereby enhancing the accuracy of closely sequential determinations.

Although but two embodiments of the invention have been shown and described in detail, it will be understood that changes may be made in the precise form and arrangement of the parts without departing from the spirit of the invention.

I claim:

1. In a freeze-tester for liquids, a metallic freezing rod, a transparent sheath mounted on the rod in spaced relation thereto with freedom for relative movement, a heat reservoir connected to one end of the rod, a source of cooling medium, means for bringing the cooling medium into intimate thermal contact with the other end of the rod, means for wetting the surface of the rod with the liquid to be tested, and a scale of length of the rod for determining the position of the frost line on the rod in relation to the ends of the rod; said transparent sheath being mounted coaxially on the freezing rod with a capillary space therebetween.

2. In a freeze-tester for liquids, a metallic freezing rod, a transparent sheath mounted on the rod in spaced relation thereto with freedom for relative movement, a heat reservoir connected to one end of the rod, a source of cooling medium, means for bringing the cooling medium into intimate thermal contact with the other end of the rod, means for wetting the surface of the rod with the liquid to be tested, and a scale of length of the rod for determining the position of the frost line on the rod in relation to the ends of the rod; said transparent sheath being mounted coaxially on the freezing rod with an annular space of less than five thousandths of an inch therebetween.

3. An instrument for determining the freezing temperature of a liquid comprising a cylinder of heat-conductive material having a uniform cross-section, means for establishing a known temperature at one end of the cylinder which is substantially below the freezing point of the liquid, means for maintaining the other end of the cylinder at a known temperature substantially above the freezing point of the liquid, a transparent insulating sheath for the cylinder spaced radially from the cylinder, and means for introducing a sample of the liquid to be tested in the space between said cylinder and sheath, said means for establishing the known cold temperature including means for cooling the cold end of the cylinder below the desired low temperature, and means for indicating when the temperature of said cold end of the cylinder rises to the desired known temperature; including further a scale of length adjacent to and parallel with the cylinder calibrated in convenient fractions of the difference in temperature between the ends of the cylinder.

4. A freeze-testing instrument as set forth in claim 3, in which said indicating means is in the form of a transparent container of liquid of known freezing point, in close thermal connection with said cold end of the cylinder.

5. A freeze-testing instrument as set forth in claim 3, in which the means for maintaining the temperature of the warm end of the cylinder comprises a thermal mass in close thermal connection with said end of the cylinder.

6. In a freeze-tester for liquids, a metallic freezing rod, means including a transparent sheath mounted on and surrounding the rod in radially spaced relation thereto to provide an enclosure for the rod, a heat reservoir connected to one end of the rod, a source of cooling medium, means for bringing the cooling medium into intimate thermal contact with the other end of the rod, means for wetting the longitudinal surface of the rod with the liquid to be tested, and a scale of length of the rod for determining the position of the frost line on the rod in relation to the ends of the rod.

7. A freeze-tester as set forth in claim 6 including further, means for indicating when the cold end of the rod is at a predetermined low temperature.

8. A freeze-tester as set forth in claim 6 including further a transparent container of liquid of known low freezing point in close thermal connection with the cold end of the rod.

References Cited in the file of this patent

UNITED STATES PATENTS

| | | |
|---|---|---|
| 2,316,624 | Romanelli | Apr. 13, 1943 |
| 2,336,238 | Fordyce et al. | Dec. 7, 1943 |
| 2,588,355 | Burr et al. | Mar. 11, 1952 |
| 2,591,084 | Martin | Apr. 1, 1952 |
| 2,633,736 | Dickey | Apr. 7, 1953 |
| 2,658,383 | Chipley | Nov. 10, 1953 |

FOREIGN PATENTS

| | | |
|---|---|---|
| 572,940 | France | Mar. 1, 1924 |
| 815,706 | Germany | Aug. 9, 1951 |

OTHER REFERENCES

Technical News Bulletin of the National Bureau of Standards, an article "NBS Antifreeze Tester," pages 166–167, vol. 35, No. 11, November 1951.